(12) United States Patent
Gazewood (10) Patent No.: US 7,789,100 B2
(45) Date of Patent: Sep. 7, 2010

(54) CONNECTION APPARATUS AND METHOD

(75) Inventor: Michael J. Gazewood, Hye, TX (US)

(73) Assignee: Venturi Oil Tools, Inc., Hye, TX (US)

( * ) Notice: Subject to any disclaimer, the term of this patent is extended or adjusted under 35 U.S.C. 154(b) by 504 days.

(21) Appl. No.: 11/975,609

(22) Filed: Oct. 19, 2007

(65) Prior Publication Data

US 2009/0102182 A1 Apr. 23, 2009

(51) Int. Cl.
*F16K 17/14* (2006.01)
(52) U.S. Cl. .................. 137/68.15; 285/2
(58) Field of Classification Search ............. 137/68.15, 137/68.17, 68.14, 614, 614.06, 614.03, 68.11, 137/614.02; 285/2, 3, 29
See application file for complete search history.

(56) References Cited

U.S. PATENT DOCUMENTS 2,819,914 A * 1/1958 Eitner .................. 285/70
2,868,563 A * 1/1959 Wood .................. 137/614.04
4,564,068 A * 1/1986 Baugh .................. 166/123

* cited by examiner

*Primary Examiner*—John Rivell
*Assistant Examiner*—Macade Brown
(74) *Attorney, Agent, or Firm*—Jones Walker (57) ABSTRACT

A connection apparatus. The apparatus comprises a wing mandrel having a first check valve disposed within an inner bore of the wing mandrel, a thread mandrel abutting the wing mandrel, with the thread mandrel having outer threads and a second check valve disposed within an inner bore of the thread mandrel. The apparatus further comprises a latch dog carrier disposed about the wing mandrel and the thread mandrel, with the latch dog carrier having a plurality of dogs, wherein the dogs having an inner portion with threads and an outer portion with outer ribs. The apparatus further contains a shell partially disposed about the latch dog carrier, with the shell having inner ribs, and wherein the inner ribs of the shell engage the outer ribs of the dogs. The apparatus further comprises a hydraulic port configured to deliver hydraulic fluid to the latch dog carrier so that the shell moves relative to the latch dog carrier in order to disconnect. A method of releasing a union is also disclosed.

20 Claims, 6 Drawing Sheets

CONNECTION APPARATUS AND METHOD

BACKGROUND OF THE INVENTION

This invention relates to a connection apparatus. More particularly, but not by way of limitations, this invention relates to an apparatus and method for disconnecting a union between a first member and a second member.

In industrial applications, a connection between two (2) tubular members needs to be secure in order to minimize leaks and prevent premature disconnection. However, in an effort to make the connection secure, it may be difficult to quickly release the connection. As those of ordinary skill in the art will appreciate, in some exigent situations, it is imperative to quickly disconnect (release) the mating connector. For instance, in an emergency situation, an operator will need to secure immediate disconnection. However, prior art connections make quick release either unfeasible or undependable or both. Furthermore, in some situations, the connections are underwater and/or in remote locations. Remote activation is either not possible or unfeasible with prior art devices.

Therefore, there is a need for a mating connection that is secure. There is also a need for a mating connection that can be remotely actuated in order to disconnect. There is also a need for a quick release union whereby release of the connection can be effected fast and dependably. These needs, as well as many others, will become apparent for the disclosure that follows.

SUMMARY OF THE INVENTION

In one preferred embodiment, a connection apparatus is disclosed. The apparatus comprises a wing mandrel having a first dart check valve disposed within an inner bore of the wing mandrel, and a thread mandrel abutting the wing mandrel, with the thread mandrel having outer threads and a second dart check valve disposed within an inner bore of the thread mandrel. The apparatus further comprises a latch dog carrier disposed about the wing mandrel and the thread mandrel, with the latch dog carrier having a plurality of openings therein and wherein the latch dog carrier contains a radial shoulder and a plurality of dogs contained within the openings, wherein the dogs having an inner portion with thread means and an outer portion with outer ribs. The apparatus further contains a support shell partially disposed about the latch dog carrier, with the support shell having inner ribs, and wherein the inner ribs of the support shell engage the outer ribs of the dogs.

In the most preferred embodiment, the apparatus further comprises means for laterally moving the support shell relative to the dogs so that the inner ribs are no longer engaged with the outer ribs. The lateral moving means may comprise hydraulic port located within the support shell, the hydraulic port configured to deliver a hydraulic fluid to the radial shoulder of the latch dog carrier so that the support shell moves relative to the latch dog carrier. The apparatus may further include a shear pin disposed through the support shell and wherein the shear pin engages the latch dog carrier, and a wing mandrel snap ring disposed within the wing half mandrel and configured to engage the latch dog carrier. Additionally, in one preferred embodiment, the wing mandrel is connected to a first tubular member and the latch dog carrier is connected to a second tubular member.

A method of disconnecting a mating connector is also disclosed. The method comprises providing the mating connector, with the mating connector including: a wing mandrel having a first check valve disposed within an inner bore of the wing mandrel; a thread mandrel abutting the wing mandrel, the thread mandrel having outer threads and a second check valve disposed within an inner bore of the thread mandrel; a latch dog carrier disposed about the wing mandrel and the thread mandrel, the latch dog carrier having a plurality of openings therein and wherein the latch dog carrier containing a radial shoulder; a plurality of dogs contained within the openings, wherein the dogs having an inner portion with thread means and an outer portion with outer ribs; a support shell partially disposed about the latch dog carrier, the support shell having inner ribs, and wherein the inner ribs of the support shell engage the outer ribs of the dogs; a hydraulic port located within the support shell, the hydraulic port configured to deliver a hydraulic fluid to the radial shoulder of the latch dog carrier so that the support shell moves relative to the latch dog carrier.

The method further comprises directing hydraulic fluid under pressure to a hydraulic port, delivering the hydraulic fluid to the radial shoulder of the latch dog carrier and moving the support shell relative to the latch dogs so that the ribs are no longer engaged. The method further includes expanding the latch dogs so that the latch dogs are no longer engaged with the outer threads of the thread mandrel and releasing the thread mandrel to travel away from the wing mandrel so that the mating connector is disconnected.

In one embodiment, the mating connector further comprises a shear pin disposed through the support shell and wherein the shear pin engages the latch dog carrier. In one preferred embodiment, the wing mandrel is connected to a first tubular member and the thread mandrel is connected to a second tubular member.

A connector apparatus is also disclosed. The connector apparatus comprises a wing mandrel having a first check valve means for preventing flow in a first direction, with the first check valve means disposed within an inner bore of the wing mandrel, and a thread mandrel abutting the wing mandrel, with the thread mandrel having outer threads and a second check valve means for preventing flow in a second direction, with the second check valve means disposed within an inner bore of the thread mandrel. The connector apparatus further comprises a latch dog carrier disposed about the wing mandrel and the thread mandrel, with the latch dog carrier having a plurality of openings therein, a plurality of dogs contained within the openings, wherein the dogs having an inner portion with thread means and an outer portion with outer ribs, and a support shell partially disposed about the latch dog carrier, the support shell having inner ribs, and wherein the inner ribs of the support shell engage the outer ribs of the dogs. In the most preferred embodiment, the first and second check valve means comprises a dart member and a spring biasing the dart member. The dart member comprises a projection with a conical surface configured to prevent flow when the biasing spring is extended.

An advantage of the present invention is that the apparatus and method are dependable. Another advantage is that the apparatus can be remotely actuated. Yet another advantage is the use of the apparatus in high pressure situations, such as oil and gas operations. Still yet another advantage is that the apparatus can be employed in underwater applications.

A feature of the present disclosure is the two (2) dart one-way valves, used in opposing orientations. Another feature is the latch dogs used to engage with the thread mandrel. Yet another feature is the hydraulic means used to shift the support shell, which in turn allows expansion of the latch dogs. Still yet another feature is that the support shell has inner ribs that engage with the outer ribs on the latch dogs.

DETAILED DESCRIPTION OF THE PREFERRED EMBODIMENTS

Figure 1:
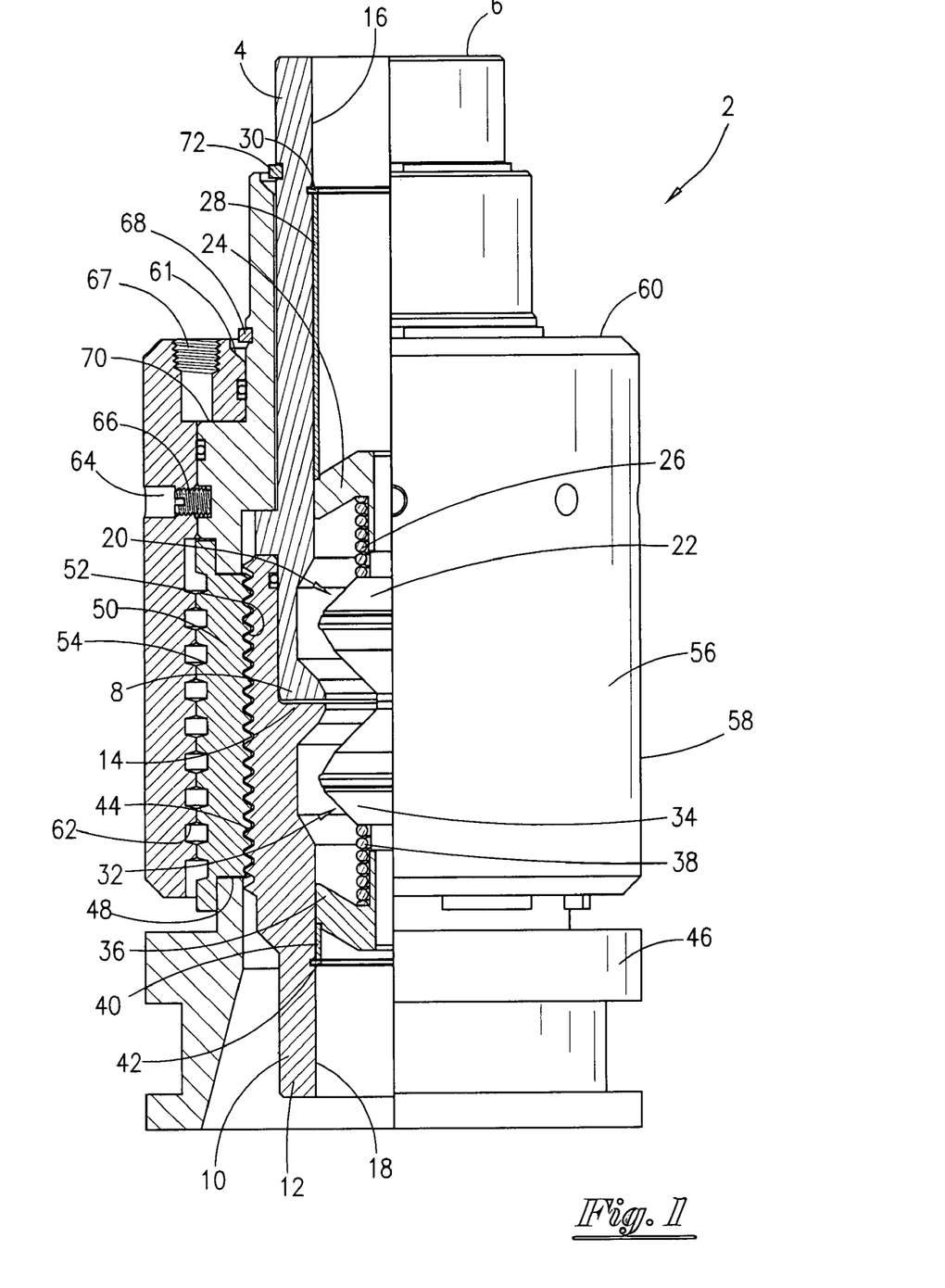
FIG. 1 is a partial cross-sectional view of the most preferred embodiment of the connection apparatus.

Referring now to FIG. 1, a partial cross-sectional view of the most preferred embodiment of the connection apparatus 2 will now be described. The connection apparatus 2 includes a wing mandrel 4 having a first end 6 and a second end 8. A thread mandrel 10 is provided, wherein said thread mandrel 10 has a first end 12 and a second end 14. As shown in FIG. 1, the second end 8 of the wing mandrel 4 abuts the second end 14 of the thread mandrel 10. The wing mandrel 4 has an inner bore portion 16 and the thread mandrel 10 has an inner bore portion 18.

The apparatus 2 also contains a first dart check valve, seen generally at 20, disposed within the inner bore 16 of the wing mandrel 4. The check valve 20 generally comprises a dart projection 22 abutting a dart sleeve 24 and a biasing spring 26 which biases against the projection 22 and sleeve 24. Also included is the spacer sleeve 28 which abuts an inner snap ring 30, wherein the inner snap ring 30 is placed within the inner bore 16.

The apparatus 2 further contains a second dart check valve, seen generally at 32, disposed within the inner bore 18 of the thread mandrel 10. The check valve 32 generally comprises a dart projection 34 abutting a dart sleeve 36, and a biasing spring 38 which biases against the projection 34 and sleeve 36. Also included is the spacer sleeve 40 which abuts an inner snap ring 42, wherein the inner snap ring 42 is placed within the inner bore 18. The thread mandrel 10 contains outer thread means, seen generally at 44.

FIG. 1 also depicts latch dog carrier 46, wherein the latch dog carrier 46 is disposed about the thread mandrel 10 and the wing mandrel 4. The latch dog carrier 46 has a series of openings in the body, such as opening 48. As per the teachings of the present invention, a plurality of dogs, such as latch dog 50, is disposed within the openings. The latch dog 50 will have an inner side with thread means 52 and an outer side with an outer rib profile 54. The dogs are longitudinal members with arcuate inner and outer surfaces. The inner thread means 52 will engage with the outer thread means 44 of the thread mandrel 10. In the most preferred embodiment, a series of six (6) dogs disposed within the latch dog carrier 46 will be used.

A support shell 56 is disposed about the latch dog carrier 46 as well as the dogs (i.e. dog 50). The support shell 56 contains an outer cylindrical surface 58 that extends to radial shoulder 60 which in turn extends to an angled shoulder 61, which in turn extends to an inner portion, with the inner portion containing inner rib profile 62 that will cooperate and engage with the outer rib profile 54. As shown in FIG. 1, the outer surface 58 contains an aperture 64 that will contain the shear pin 66, and wherein the shear pin 66 is engaged with a portion of the latch dog carrier 46. FIG. 1 also depicts the port 67 for engagement with a hydraulic fluid supply.

FIG. 1 also depicts the latch dog carrier snap ring 68, wherein the snap ring 68 is seated within an outer groove of the latch dog carrier 46. The snap ring 68 engages the angled shoulder 61 contained within the radial shoulder 60. In this way, as pressure is applied to the port 66, the pressure acts against the radial shoulder 70 of the latch dog carrier 46. A wing mandrel snap ring 72 is shown disposed about the wing mandrel 4, and wherein the snap ring 72 is configured to engage the latch dog carrier 46.

Figure 2:
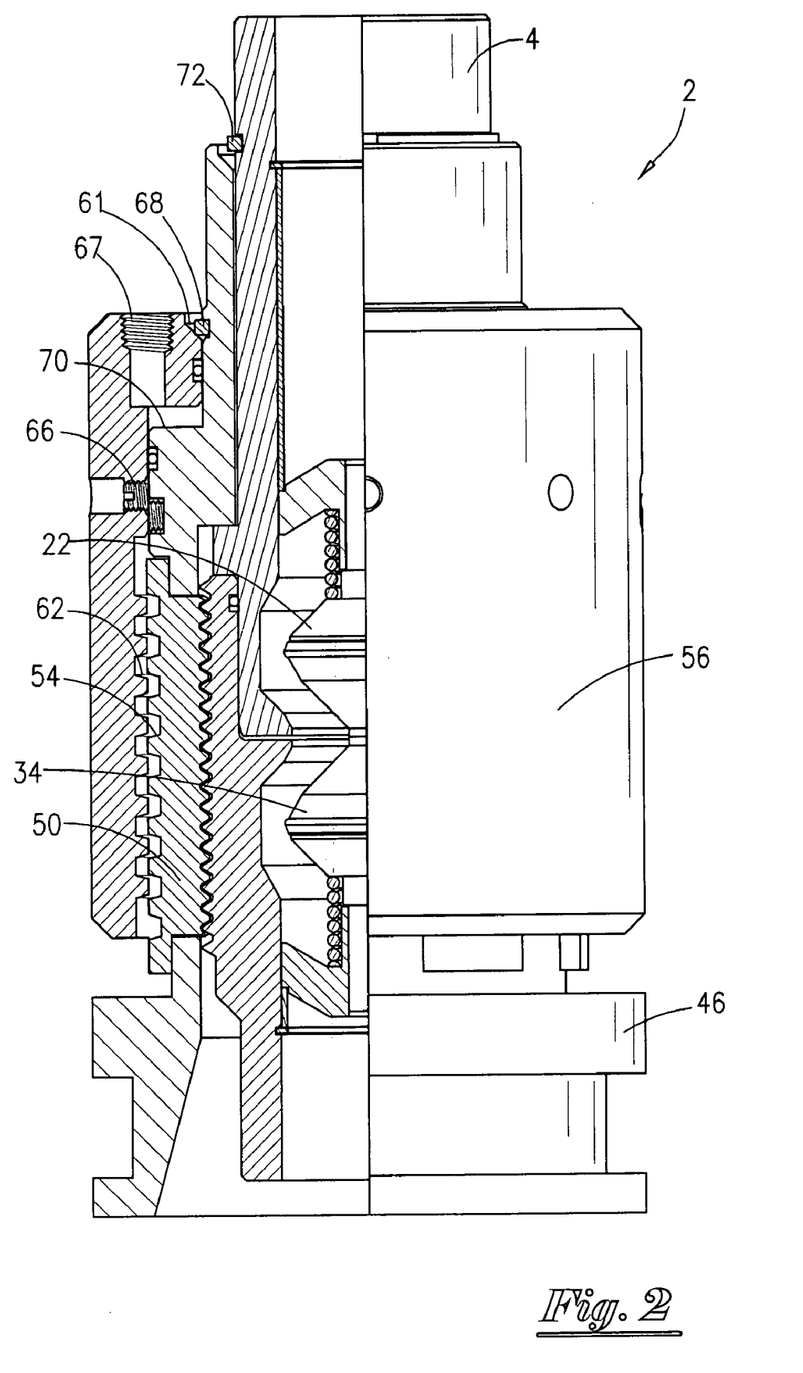
FIG. 2 is a partial cross-sectional sequential view of the most preferred embodiment seen in FIG. 1 with an applied hydraulic pressure moving the support shell.
Figure 3:
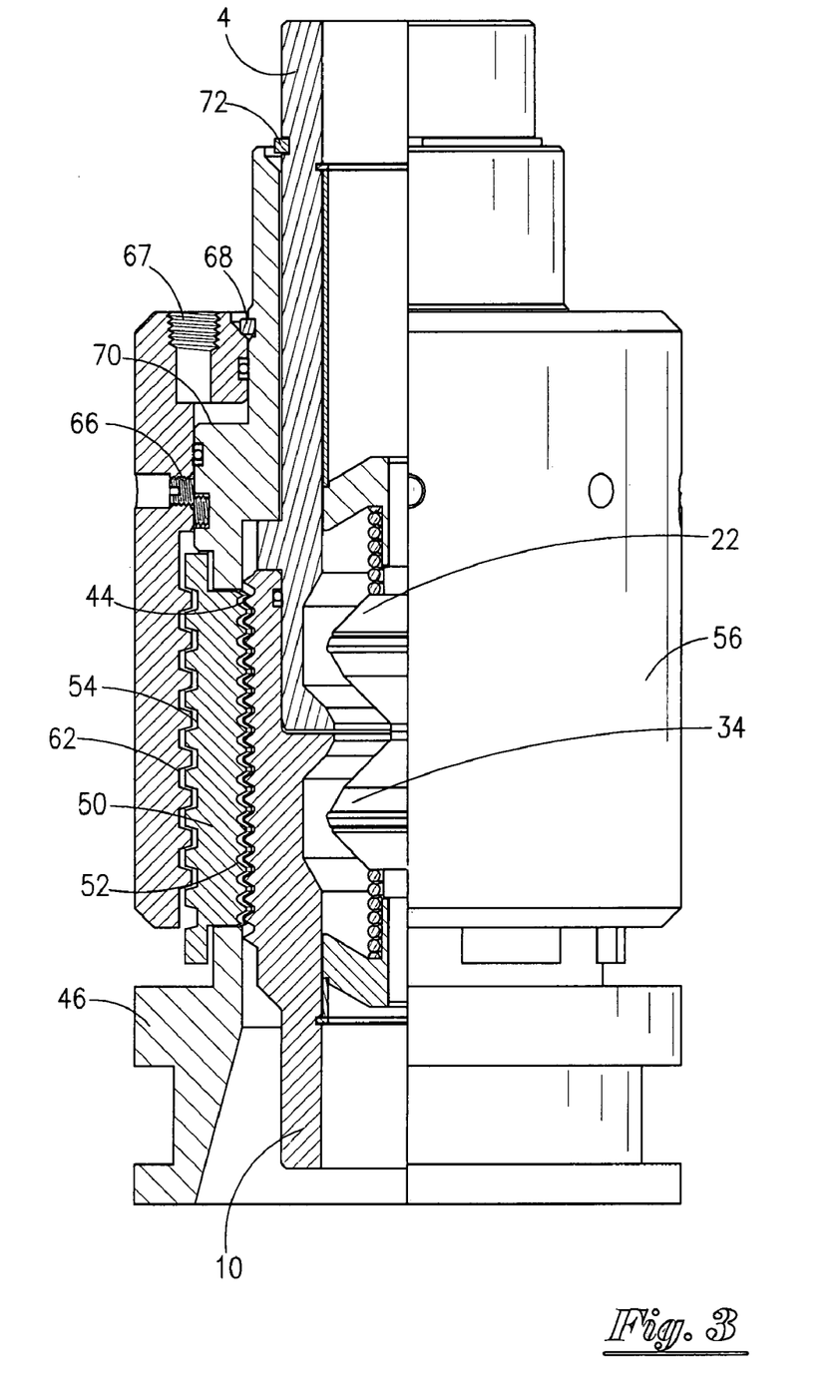
FIG. 3 is a partial cross-sectional sequential view of the most preferred embodiment seen in FIG. 2 depicting the latch dogs moving outwardly.

Referring now to FIG. 2, a partial cross-sectional sequential view of the most preferred embodiment of the apparatus 2 seen in FIG. 1 with an applied hydraulic pressure moving the support shell 56. More specifically, a hydraulic pressure is applied to the port 67 which in turn will act against the radial shoulder 70 of the latch dog carrier 46. The application of pressure will act to force the support shell 56 to travel (to the right in FIG. 2), wherein the shell 56 stops on the latch dog carrier snap ring 68. The latch dogs 50 can expand outward since the ribs may inter-engage as seen in FIG. 3. Returning to FIG. 2, hence, after the application a predetermined pressure force, the pin 66 will shear as seen in FIG. 2. The support shell 56 continues to travel upward where the support shell 56 will stop on the latch dog carrier snap ring 68, and more specifically, where the snap ring 68 abuts the shoulder 61. As seen in FIG. 2, inner rib profile 62 has begun to shift relative to the outer rib profile 54.

In FIG. 3, a partial cross-sectional sequential view of the most preferred embodiment seen in FIG. 2 is illustrated, and wherein the latch dogs (for instance, latch dog 50) have been moved outwardly. More specifically, the outer rib profile 54 of the dogs had been engaging the inner rib profile 62 of the support shell 56 (and hence constrained from expanding). However, as seen in FIG. 3, the inner ribs 62 and outer ribs 54 are now aligned allowing for additional radial space so that the latch dogs can travel axially outward thereby expanding the latch dogs. The radial outward action in turn releases (i.e. disengages) the thread mandrel 10 to travel.

Figure 4:
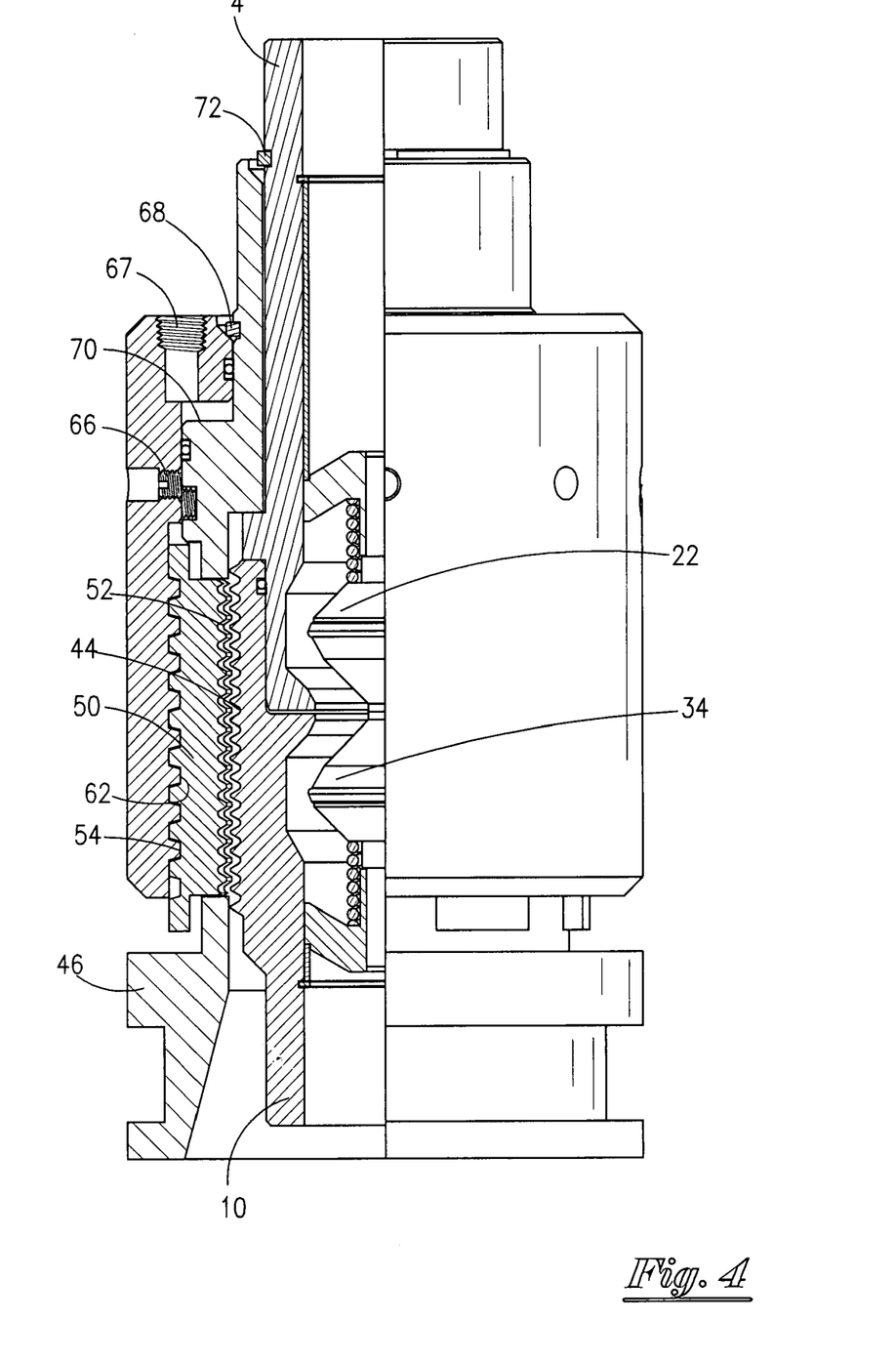
FIG. 4 is a partial cross-sectional sequential view of the most preferred embodiment seen in FIG. 3 depicting the latch dogs being disengaged from the thread mandrel.

Referring now to FIG. 4, a partial cross-sectional sequential view of the most preferred embodiment seen in FIG. 3 is shown. FIG. 4 depicts the latch dogs (for instance dog 50) being disengaged from the thread mandrel 10. Therefore, the outer thread means 44 of the thread mandrel 10 and the inner thread means 52 of the dogs are no longer engaged. The thread mandrel 10 is now detached from the latch dog carrier 46 and the wing mandrel 4.

Figure 5:
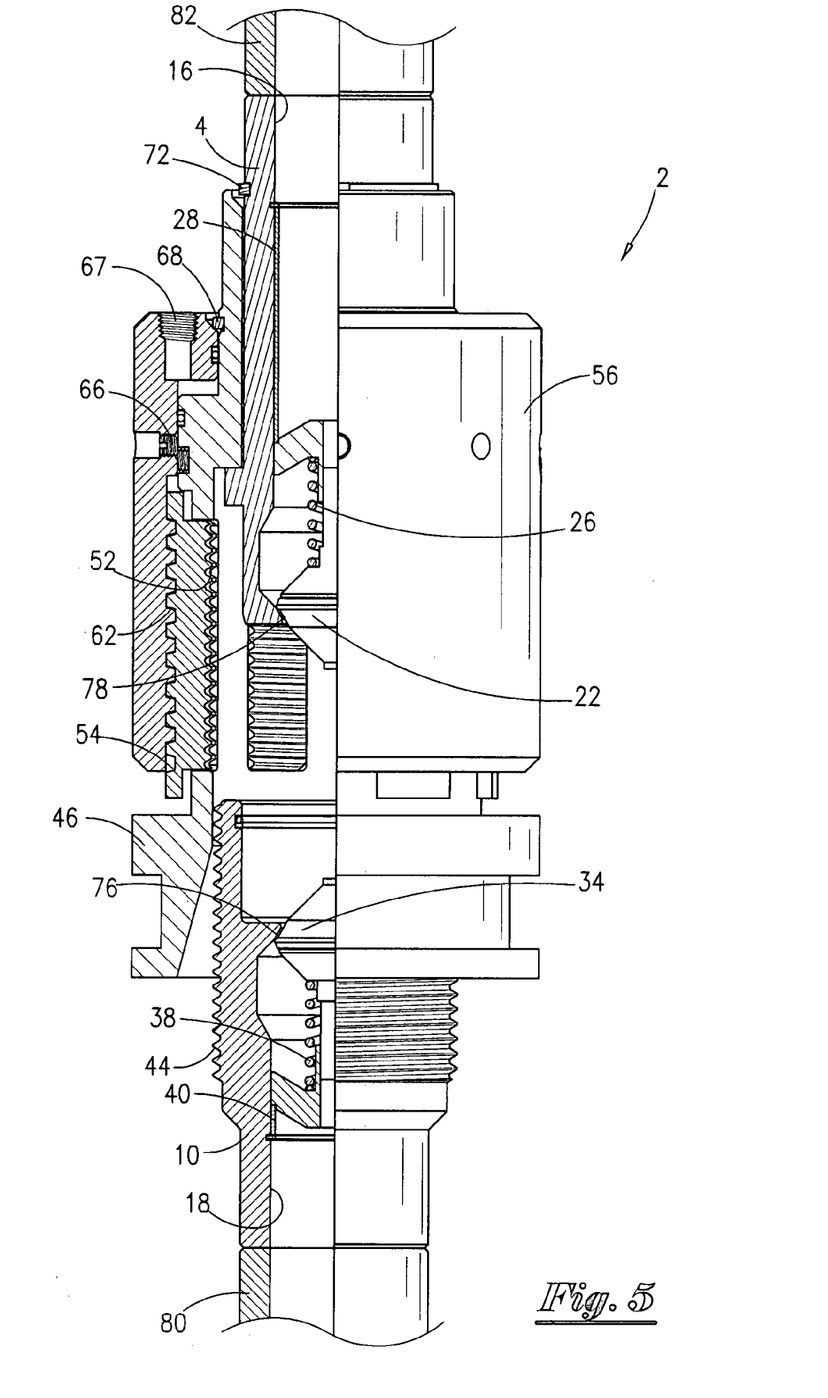
FIG. 5 is a partial cross-sectional sequential view of the apparatus seen in FIG. 4 depicting the thread mandrel detached so that the thread mandrel can fall to the ocean bottom.

In FIG. 5, a partial cross-sectional sequential view of the apparatus 2 seen in FIG. 4 depicting the thread mandrel 10 detached so that the thread mandrel 10 can fall, for example, to the ocean bottom. More particularly, the latch dog carrier 46 is now totally detached from the latch dogs. For instance, the outer thread means 44 no longer overlap the inner thread means 52 so that the thread mandrel 10 is freed from the latch dog carrier 46 and the wing mandrel 4, as seen in FIG. 5. Additionally, the dart projection 34 has been extended so that the dart projection 34 engages with the seal surface 76 within inner bore 18, and wherein the dart projection 34 has been biased forward with the spring 38. The dart projection 22 has been extended so that the dart projection 22 engages with the seal surface 78 within inner bore 16, and wherein the dart projection 22 has been biased forward with the spring 26. Note that the spacer sleeves 40, 28# hold the dart projections 34, 22 in place. The dart members comprise a projection with a conical surface configured to prevent flow when the biasing spring is extended.

As previously noted, the thread mandrel 10 can be attached to a first tubular 80 and wing mandrel 4 can be attached to a second tubular 82, wherein the tubulars 80, 82 form part of a conduit system. In one preferred embodiment, the conduit system transports fluids and gas, such as hydrocarbon fluids and gas from subterranean wells, as well understood by those of ordinary skill in the art. Many times, the connection apparatus 2 and associated tubulars 80, 82 will be under significant pressure and temperature. Also, the connection apparatus 2 may be in remote locations such as on the ocean floor in thousands of feet of water.

Figure 6:
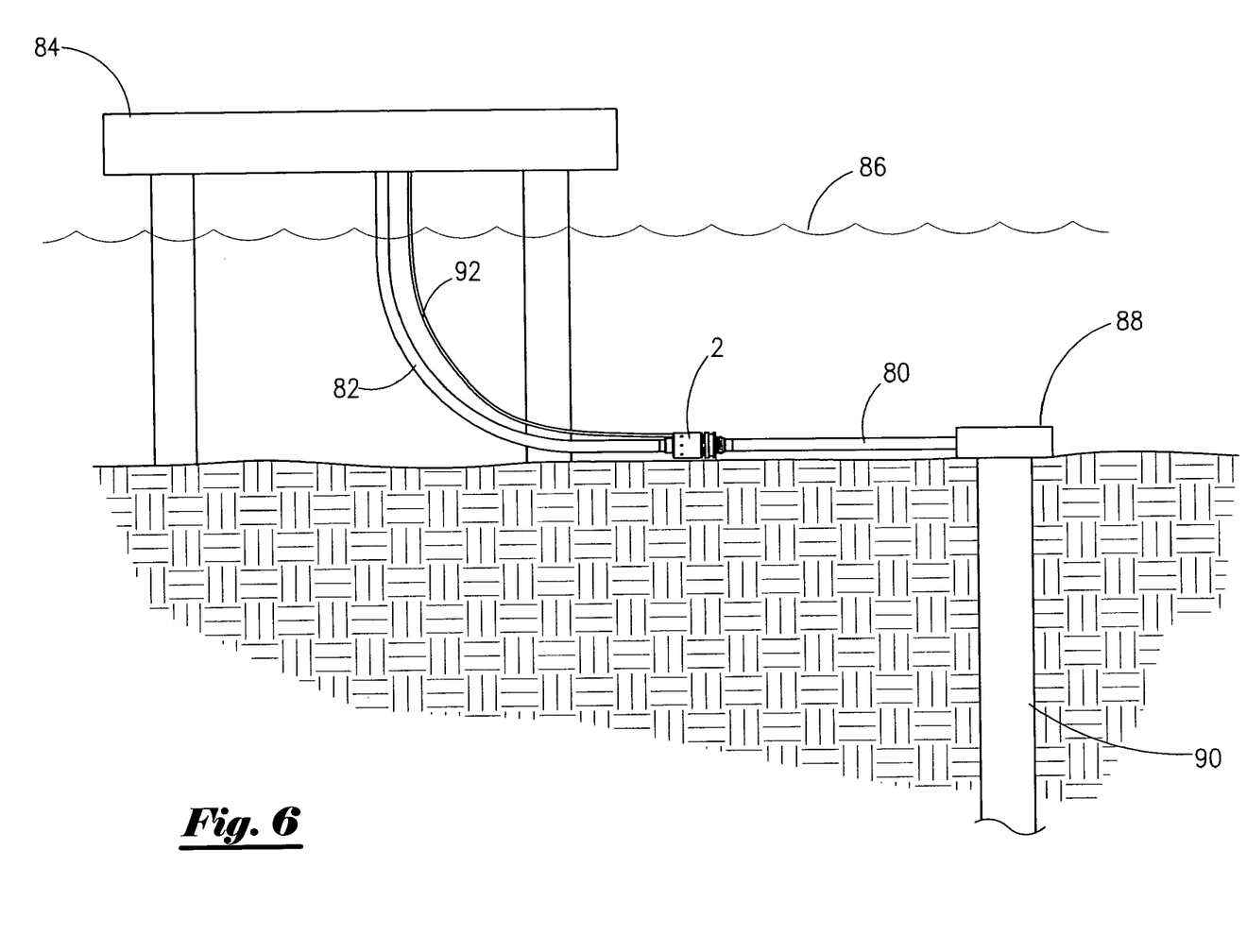
FIG. 6 is a schematic illustration of the disclosed connection apparatus being used in an offshore application.

FIG. 6 is a schematic illustration of the disclosed connection apparatus 2 being used in an offshore application. FIG. 6 depicts an offshore platform 84 set on the ocean floor, wherein the top of the ocean is denoted by the numeral 86. A sub-sea wellhead 88 is operatively associated with a subterranean well 90. The connection apparatus 2 is connected to the tubular 80 as well as the tubular 82. The hydraulic line 92 is shown, and wherein the hydraulic line 92 is connected to the port of the apparatus 2 as previously described.

Hence, when the connection apparatus 2 is made-up (i.e. connected), fluids and gas can be channeled there through. In the case of emergency, or any other time the operator deems it necessary to disconnect, hydraulic pressure is applied to the port (i.e. port 67 in FIG. 1) via hydraulic line 92, which in turn causes the disconnection of the union. Due to the design of the check valves, fluids and gas will be contained within the tubulars 80, 82, and a spill is prevented. An example of an emergency situation is a hurricane when an operator may find it necessary to rig-down and move certain equipment, while leaving other equipment at the site. The disconnect can be done, according to the teachings of this disclosure, safely, quickly and dependably.

Although the present invention has been described in terms of specific embodiments, it is anticipated that alterations and modifications thereof will no doubt become apparent to those skilled in the art. It is therefore intended that the following claims and equivalents thereof be interpreted as covering all such alterations and modifications as fall within the true spirit and scope of the invention.

I claim:

1. A connection apparatus comprising:
   a wing mandrel having a first dart check valve disposed within an inner bore of said wing mandrel;
   a thread mandrel abutting said wing mandrel, said thread mandrel having outer threads and a second dart check valve disposed within an inner bore of said thread mandrel;
   a latch dog carrier disposed about said wing mandrel and said thread mandrel, said latch dog carrier having a plurality of openings therein and wherein said latch dog carrier containing a radial shoulder;
   a plurality of dogs contained within said openings, wherein said dogs having an inner portion with thread means and an outer portion with outer ribs;
   a support shell partially disposed about said latch dog carrier, said support shell having inner ribs, and wherein said inner ribs of the support shell engage the outer ribs of the dogs.

2. The connection apparatus of claim 1 further comprising:
   means for laterally moving said support shell relative to said dogs so that the inner ribs of said support shell are no longer engaged with the outer ribs of said dogs.

3. The connection apparatus of claim 2 wherein said lateral moving means comprises:
   hydraulic port located within said support shell, said hydraulic port configured to deliver a hydraulic fluid to the radial shoulder of said latch dog carrier so that said support shell moves relative to said latch dog carrier.

4. The connection apparatus of claim 3 further comprising:
   a shear pin disposed through said support shell and wherein said shear pin engages said latch dog carrier.

5. The connection apparatus of claim 4 wherein said wing mandrel is connected to a first tubular member.

6. The connection apparatus of claim 5 wherein said thread mandrel is connected to a second tubular member.

7. The connection apparatus of claim 6 further comprising:
   a wing mandrel snap ring, disposed about said wing mandrel, and configured to engage said latch dog carrier.

8. A method of disconnecting a mating connector comprising:
   providing the mating connector, said mating connector comprising: a wing mandrel having a first check valve disposed within an inner bore of said wing mandrel; a thread mandrel abutting said wing mandrel, said thread mandrel having outer threads and a second check valve disposed within an inner bore of said thread mandrel; a latch dog carrier disposed about said wing mandrel and said thread mandrel, said latch dog carrier having a plurality of openings therein and wherein said latch dog carrier containing a radial shoulder; a plurality of latch dogs contained within said openings, wherein said dogs having an inner portion with thread means and an outer portion with outer ribs; a support shell partially disposed about said latch dog carrier, said support shell having inner ribs, and wherein said inner ribs of the support shell engage the outer ribs of the dogs; hydraulic port located within said support shell, said hydraulic port configured to deliver a hydraulic fluid to the radial shoulder of said latch dog carrier so that said support shell moves relative to said latch dog carrier;
   directing hydraulic fluid under pressure to the hydraulic port;
   delivering the hydraulic fluid to the radial shoulder of the latch dog carrier;
   moving said support shell relative to said latch dogs so that the ribs are no longer engaged;
   expanding said latch dogs so that said latch dogs are no longer engaged with the outer threads of said thread mandrel;
   releasing said thread mandrel to travel away from said wing mandrel so that the mating connector is disconnected.

9. The method of claim 8 wherein said mating connector further comprises: a shear pin disposed through said support shell and wherein said shear pin engages said latch dog carrier.

10. The method of claim 9 wherein said wing mandrel is connected to a first tubular member.

11. The method of claim 10 wherein thread mandrel is connected to a second tubular member.

12. The method of claim 11 wherein said mating connector further comprises a wing mandrel snap ring, disposed within said wing mandrel and configured to engage said latch dog carrier.

13. A connector apparatus comprising:
   a wing mandrel having a first check valve means for preventing flow in a first direction, said first check valve means disposed within an inner bore of said wing mandrel;

a thread mandrel abutting said wing mandrel, said thread mandrel having outer threads and a second check valve means for preventing flow in a second direction, said second check valve means disposed within an inner bore of said thread mandrel;

a latch dog carrier disposed about said wing mandrel and said thread mandrel, said latch dog carrier having a plurality of openings therein and wherein said latch dog carrier containing a radial shoulder;

a plurality of dogs contained within said openings, wherein said dogs having an inner portion with thread means and an outer portion with outer ribs;

a support shell partially disposed about said latch dog carrier, said support shell having inner ribs, and wherein said inner ribs of the support shell engage the outer ribs of the dogs;

means for laterally moving said support shell relative to said dogs so that the inner ribs are no longer engaged with the outer ribs.

14. The connector apparatus of claim 13 wherein said first check valve means and said second check valve means comprises:

a dart member;

a spring biasing said dart member.

15. The connection apparatus of claim 14 wherein said lateral moving means comprises:

hydraulic port located within said support shell, said hydraulic port configured to deliver a hydraulic fluid to the radial shoulder of said latch dog carrier so that said support shell moves relative to said latch dog carrier.

16. The connection apparatus of claim 15 further comprising:

a shear pin disposed through said support shell and wherein said shear pin engages said latch dog carrier.

17. The connection apparatus of claim 16 wherein said wing mandrel contains a plurality of snap rings, said snap rings engaging said latch dog carrier in order to prevent movement of the wing mandrel relative to the support shell.

18. The connection apparatus of claim 17 wherein said wing mandrel is connected to a first tubular member.

19. The connection apparatus of claim 18 wherein said thread mandrel is connected to a second tubular member.

20. The connection apparatus of claim 19 wherein said dart member comprises a projection with a conical surface configured to prevent flow when the biasing spring is extended.

* * * * *